US006214459B1

(12) United States Patent
Beck et al.

(10) Patent No.: US 6,214,459 B1
(45) Date of Patent: Apr. 10, 2001

(54) INKABLE SHEETS

(75) Inventors: Nicholas C. Beck, Manningtree; Gary W. Morrison, London, both of (GB)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 09/355,306

(22) PCT Filed: Jan. 28, 1998

(86) PCT No.: PCT/GB98/00255

§ 371 Date: Sep. 24, 1999

§ 102(e) Date: Sep. 24, 1999

(87) PCT Pub. No.: WO98/32611

PCT Pub. Date: Jul. 30, 1998

(30) Foreign Application Priority Data

Jan. 28, 1997 (GB) ..... 9701730
Jul. 2, 1997 (GB) ..... 9713933

(51) Int. Cl.[7] ..... B32B 23/08; B32B 27/08; B32B 27/30; B32B 27/36; B32B 27/40

(52) U.S. Cl. ..... 428/337; 428/195; 428/339; 428/423.7; 428/480; 428/481; 428/483; 428/532; 524/284; 524/300; 524/315; 524/322; 524/321

(58) Field of Search ..... 428/195, 343, 428/355 R, 355 CP, 355 AK, 355 AC, 423.7, 480, 483, 532, 337, 339; 524/284, 300, 315, 322, 321

(56) References Cited

U.S. PATENT DOCUMENTS 4,555,437 11/1985 Tanck .
4,701,837 10/1987 Sakaki et al. .
4,865,914 9/1989 Malhotra .

FOREIGN PATENT DOCUMENTS

0444950A2 4/1991 (EP) .
0716929A1 6/1996 (EP) .

*Primary Examiner*—Vivian Chen
(74) *Attorney, Agent, or Firm*—Pillsbury Winthrop LLP

(57) ABSTRACT

An inkable sheet comprises a substrate having on at least one surface thereof an ink absorbent layer comprising a cellulose material and an acid functional resin which is insoluble in water of neutral or acidic pH at room temperature. The acid functional resin may comprise an acid functional polyurethane resin or an acid functional acrylic resin such as a polyacrylate/acrylic acid copolymer. The ink absorbent layer preferably further comprises a weak organic acid or salt thereof and/or at least one crosslinking agent.

22 Claims, No Drawings

INKABLE SHEETS

FIELD OF INVENTION

The present invention relates to inkable sheets and concerns inkable sheets and their production.

BACKGROUND TO THE INVENTION

With the recent proliferation of microcomputers and colour monitors, there has been a massive growth in the amount of information available for display in colour. Presentation of such information has created a demand for hard copy, for example on paper sheets, on opaque plastics films (which can be more robust than paper sheets) and also on transparent sheets, which are suitable for viewing in transmission mode, e.g., by overhead projection.

Ink jet printing is well established as a technique for printing such information including multi-colour graphics. In ink jet printing, an ink droplet is projected on to an ink receptive sheet at high velocity (e.g., up to 20 m/s). Movement of the ink jet may be computer controlled, and characters may be formed and printed rapidly. To derive advantage from this high speed operating capability requires an ink receptive sheet, which will rapidly absorb the high velocity ink droplet without blotting or bleeding.

To improve image resolution, ink jet printers have been developed which are capable of providing a greater density of ink droplets, for example up to about 1440 dots per inch (dpi). For a given droplet size, the increased 'dpi' of such printers as compared with that of lower resolution printers has the effect of increasing the volume per unit area of ink to be absorbed.

Generally, an inkable sheet suitable for use with ink jet printers comprises a substrate carrying an ink absorbent layer. For use in overhead projection, the substrate must, of course, be transparent and transparent polyethylene terephthalate or transparent polyvinyl chloride films are commonly used. In the case of opaque plastics films, opaque polyethylene terephthalate or opaque polyvinyl chloride films are commonly used. The ink absorbent layer typically comprises a polymer or a mixture of polymers and combinations of cellulosic polymers such as nitrocellulose, carboxymethyl cellulose and especially hydroxyethyl cellulose; gelatins; vinyl polymers such as polyvinyl acetate and polyvinyl pyrrolidone; and acrylic polymers such as polyacrylic acid are described in EP-A-0156532, EP-A-0232040 and EP-A-023 3703.

A further consideration is that the use of aqueous based inks having a high water content (possibly up to 95%) is becoming more common. Such inks used for multicolour printing (i.e. cyan, magenta, yellow and black) generally consist of an aqueous solution of an appropriate dye. However, recently there has been a trend to the use of black ink consisting of an aqueous dispersion of a pigment together with a polymer whose function is to hold the pigment together when the ink has dried. Under certain circumstances, the presence of such a polymer in the ink can cause problems, in that if the ink polymer and the polymer in the absorbing layer of an inkable sheet become intermixed, swelling and subsequent shrinking of the ink dot can result, leading to cracking of the dried dot with a consequent reduction of the optical density. This is particularly serious in the transmission mode, where the optical density can be reduced by up to 50% due to light passing through the cracks.

The present invention aims to alleviate the above problems associated with the prior art.

SUMMARY OF THE INVENTION

In its broadest aspect, the present invention provides an inkable sheet comprising a substrate having on at least one surface thereof an ink absorbent layer comprising a cellulose material and an acid functional resin.

The solubility of the ink absorbent layer in an ink applied thereto may be reduced by including materials in an absorbent layer which are insoluble in cold water of neutral or acidic pH. Alternatively, the solubility of the ink absorbent layer can be limited by including at least one cross linking agent in the absorbent layer.

In another aspect the present invention provides an inkable sheet comprising a substrate having on at least one surface thereof an ink absorbent layer comprising a cellulose material, an acid functional resin and a weak organic acid or salt thereof.

Suitably, the weak organic acid comprises citric acid, tartaric acid, succinic acid, acetic acid or malic acid. The salt is conveniently an ammonium salt of such acids. Preferably, the weak organic acid comprises citric acid, or an ammonium salt thereof. Mixtures of acids and/or salts may be used.

With tri-ammonium citrate it is believed that ammonia is lost during product manufacture (typically involving heating to a temperature of 130° C.) and that the presence of the citrate ions reduces the pH of the coating and reduces the solubility of the resins. Indeed, it has been found that citric acid is an effective alternative to tri-ammonium citrate, although ammonia may have to be simultaneously added to the formulation to maintain the solubility of the acid functional resins if they are not present as a dispersion. Other weak organic acids such as tartaric acid, succinic acid, acetic and malic acid are also effective in achieving good performance with pigmented inks.

In a particular aspect, the invention provides an inkable sheet comprising a substrate having on at least one surface thereof an ink absorbent layer comprising hydroxypropylmethyl cellulose, an acrylic polymer and a citrate.

According to a further aspect of the present invention, there is provided an inkable sheet comprising a substrate having on at least one surface thereof an ink absorbent layer comprising a cellulose material, an acid functional resin and at least one cross linking agent.

In a further particular aspect of the invention, there is provided an inkable sheet comprising a substrate having on at least one surface thereof an ink absorbent layer comprising hydroxypropylmethyl cellulose, an acrylic polymer and a cross linking agent.

Suitable cross linking agents for use in the present invention include melamine formaldehyde resins, polyethylene imines, urea formaldehyde or blocked isocyanates.

The cross linking agent acts to cross link at least the acid functional resin thus reducing solubility in ink, hence improving performance. The cross linking agent may additionally act to cross link the cellulose material. The cross linking agent should thus be effective in cross linking at least the acid functional resin and possibly also the cellulose material.

The cellulose material employed in the absorbent layer of an inkable sheet according to the present invention conveniently comprises hydroxypropylmethyl cellulose or carboxymethyl cellulose, with hydroxypropylmethyl cellulose currently being preferred.

Preferably, the acid functional resin comprises an acid functional polyurethane resin or an acid functional acrylic resin such as a polyacrylate/acrylic acid copolymer. In general, the higher the molecular weight of the resin, the better the performance. Further, the more insoluble the resin is in cold water at neutral or acidic pH, the better the performance. The acid functional resin (possibly after being cross linked) is thus preferably insoluble in water of neutral or acidic pH at room temperature. Suitable acid functional resins are commercially available and are generally supplied in solid form, in solution in appropriate solvents, or as aqueous dispersions.

It may be advantageous if the absorbent layer further comprises an agent which acts to reduce crystallisation of coloured (i.e. cyan, magenta or yellow) dyes when applied to the inkable sheet. The absorbent layer may therefore preferably further comprise hydroxyethyl cellulose, as the latter can be advantageous in reducing any tendency of coloured dyes to crystallise as described above.

It may also be advantageous for the absorbent layer further to comprise an agent which acts to reduce curl of an inkable sheet according to the present invention, in particular when the latter is placed on a hot surface, for example a platen of an overhead projector or the like. The absorbent layer preferably therefore further comprises a suitable anti-curl agent, which is conveniently in the form of a polymer having hydroxyl groups or oxygen-ether links, for example polyethylene glycol or the like, which is effective in reducing any tendency for the inkable sheet to curl as described above. Curl can also be reduced by use of an acid functional resin with a glass transition temperature (Tg) below room temperature (below about 20° C.), preferably below 0° C.

The present invention can also alleviate a further problem hitherto associated with ink jet printing, which occurs when there is overprinting of a first dot with a subsequent dot before the first dot had completely dried. According to a preferred feature of the present invention, this problem can be alleviated by the inclusion in the ink absorbent layer of an absorptive agent which can increase the rate of water absorption from an ink applied to the absorbent layer. Suitably, lithium nitrate is employed as the absorptive agent which increases the rate of water absorption, resulting in the first dot being drier when it is overlaid than would otherwise be the case.

If desired, the ink absorbent layer may further comprise other additive compounds, such as plasticisers or the like. The term "plasticiser" as used herein denotes any additive which may be incorporated into a polymeric material of the ink absorbent layer so as to improve its softness, processability and flexibility.

Suitable plasticisers are well known per se in the plastics art, particularly for modifying the characteristics of polyvinyl chloride, and are usually organic materials in the form of moderately high molecular weight liquids or low melting point solids. Most commonly, such plasticisers can comprise esters of carboxylic acids or phosphoric acid, although hydrocarbons, halogenated hydrocarbons, ethers, glycols, polyglycols and hydrogenated or epoxidised drying oils (e.g. soya bean oil) may also be employed, as described in EP-A-0232040.

An additive compound such as a surfactant may also be employed in the ink absorbent layer of an inkable sheet according to the present invention, so as to improve the ageing behaviour of the ink absorbent layer and promote absorption and drying of subsequently applied ink. Suitable surfactants include a non-ionic fluorocarbon surfactant or a cationic surfactant, such as a quaternary ammonium salt or the like. Additionally a humectant, such as glycerol, may be employed in the ink absorbent layer.

If desired, the ink absorbent layer may additionally comprise a particulate filler additive compound so as to improve the handling characteristics of the sheet. Suitable fillers include oxides or hydroxides of metals or metalloids, such as aluminium hydroxide, silica, glass beads or polyethylene waxes, desirably of a particle size not exceeding 50 $\mu$m, preferably 10 to 30 $\mu$m. The amount of filler employed will be dictated by the desired characteristics of the sheet but will generally be low to ensure that the optical characteristics (such as haze) of the sheet remain substantially unimpared. Typically filler loadings are of the order of less than 2.0%, and preferably from 0.1 to 1.0%, by weight of the components of the absorbent layer.

Other additive compounds conventionally employed in an ink absorbent layer of an inkable sheet may be incorporated into the ink absorbent layer of an inkable sheet according to the present invention.

The substrate of an inkable sheet according to the present invention suitably comprises any material capable of forming a self-supporting opaque, or transparent, film or sheet. By a "self-supporting film or sheet" as referred to herein is meant a film or sheet capable of independent existence in the absence of a supporting base. The substrate is typically a polymeric material, but may alternatively comprise paper, cardboard or other similar materials.

Suitable thermoplastics materials for use in the production of a substrate include a cellulose ester, e.g. cellulose acetate polystyrene, a polymer and copolymer of vinyl chloride, polysulphone, a homopolymer or copolymer of a 1-olefine, such as ethylene, propylene and but-1-ene, a polyamide, a polycarbonate, and, particularly, a synthetic linear polyester which may be obtained by condensing one or more dicarboxylic acids or their lower alkyl (up to 6 carbon atoms) diesters, e.g. terephthalic acid, isophthalic acid, phthalic acid, 2,5- 2,6- or 2,7-naphthalenedicarboxylic acid, succinic acid, sebacic acid, adipic acid, azelaic acid, 4,4'-diphenyldicarboxylic acid, hexahydroterephthalic acid or 1,2-bis-p-carboxyphenoxyethane (optionally with a monocarboxylic acid, such as pivalic acid) with one or more glycols, particularly an aliphatic glycol, e.g. ethylene glycol, 1,3-propanediol, 1,4-butanediol, neopentyl glycol and 1,4-cyclohexanedimethanol. A polyester terephthalate film is particularly preferred, especially such a film which has been biaxially oriented by sequential stretching in two mutually perpendicular directions, typically at a temperature in the range 70 to 125° C., and preferably heat set, typically at a temperature in the range 150 to 200° C., for example as described in GB-A-838708.

The substrate may also comprise a polyarylether or thio analogue thereof, particularly a polyaryletherketone, polyarylethersulphone, polyaryletheretherketone, polyaryletherethersulphone, or a copolymer or thioanalogue thereof. Examples of these polymers are disclosed in EP-A-1879, EP-A-184458 and U.S. Pat. No. 4,008,203, particularly suitable materials being those sold by ICI PLC under the Trade Mark STABAR. Blends of these polymers may also be employed.

Suitable thermoset resin substrate materials include addition-polymerisation resins such as acrylics, vinyls, bismaleimides and unsaturated polyesters; formaldehyde condensate resins such as condensates with urea, melamine or phenols; cyanate resins; functionalised polyesters; polyamides or polyimides.

The substrate suitably has a thickness in the range 25 to 300 $\mu$, particularly in the range 50 to 175 $\mu$m, and especially in the range 75 to 130 $\mu$m.

An ink absorbent layer employed in the present invention is suitably applied to the substrate by a conventional coating technique, for example by deposition from a solution or dispersion of the components of the ink absorbent layer in a volatile medium, such as an aqueous or organic solvent medium.

There is further provided by the present invention therefore a process of preparing an inkable sheet in accordance with the invention, which process comprises applying to at least one surface of a substrate an ink absorbent layer comprising a cellulose material and an acid functional resin. Preferably, the ink absorbent layer comprises a cellulose material, an acid functional resin and a weak organic acid or salt thereof. Alternatively, the ink absorbent layer comprises a cellulose material, an acid functional resin and at least one cross linking agent.

Drying of the applied ink absorbent layer may be effected by conventional drying techniques, for example by suspending the coated substrate in a hot air oven maintained at an appropriate temperature. A drying temperature of about 130° C. is usually suitable for a polyester substrate.

The thickness of the dry ink absorbent layer may vary over a wide range, but is conveniently 50 μm or less, especially in the range from 2 to 30 μm, and preferably in the range 5 to 20 μm, for example 10 μm.

To promote adhesion of the ink absorbent layer to a polymeric substrate, it is often desirable first to treat a surface of the substrate with a priming medium. Creation of a priming layer is conveniently effected by treating a surface of a polymeric substrate with an agent known in the art to have a solvent or swelling action on the substrate polymer. Examples of such conventional agents, which are particularly suitable for the treatment of a polyester substrate, include a halogenated phenol dissolved in a common organic solvent e.g. a solution of p-chloro-m-cresol, 2,4-dichlorophenol, 2,4,5- or 2,4,6-trichlorophenol or 4-chlororesorcinol in acetone or methanol. In addition, and preferably, the priming medium may contain a partially hydrolysed vinyl chloride-vinyl acetate copolymer. Such a copolymer conveniently contains from 60 to 98% of vinyl chloride, and from 0.5 to 3% of hydroxyl units, by weight of the copolymer. The molecular weight (number average) of the copolymer is conveniently in a range of from 10,000 to 30,000, and preferably from 16,500 to 25,000. Desirably the priming layer comprises a polyester material.

If desired, a plurality of priming layers may be sequentially applied to a substrate of an inkable sheet according to the present invention.

The priming medium is suitably applied at a concentration level which will yield a priming layer having a relatively thin dry coat thickness, for example generally less than 2 μm, and preferably less than 1 μm.

There is still further provided by the present invention use of an intimate mixture comprising a cellulose material and an acid functional resin, as an ink absorbent layer for at least one surface of an inkable sheet in accordance with the invention.

The invention is applicable to both transparent and opaque inkable sheets, with particular application to sheets for use in ink jet printing, and has been found to be capable of giving good performance on both transparent sheets and opaque sheets, eg of polyester. By reducing the solubility of the ink absorbent layer in an ink applied thereto, better performance can be obtained. Performance of transparent sheets is conveniently measured in terms of the optical density (OD) of black ink printed onto a sheet, eg by ink jet printing, and OD levels of about 2 are readily achievable with sheets in accordance with the invention. Such OD levels are indicative of good print quality and absence of ink shrinking and cracking. Good light fastness, low curl and good dark stability are also achievable.

The invention is illustrated by the following examples.

EXAMPLE 1

Six sheets of 96 μm thick, biaxially oriented, uncoated, polyethylene terephthalate film substrate (Melinex Grade OP from ICI) were coated with ink absorbent layers based on the formulations 1 to 6 shown in Table 1 using the following method.

The methanol was placed in a container equipped with a high speed stirrer and the cellulose derivative(s) added. When dispersion was complete, most of the water was added followed by the Surcol 441 and/or the Surcol 860 (with sufficient ammonia being added to facilitate dissolving of the Surcol resin) and swelling allowed for 15 minutes. The remaining components, dissolved in the balance of the water, were finally added. The solutions were coated and dried at 130° C. for 2 minutes to give a dry coating thickness of approximately 10 μm.

Each piece was printed using a Hewlett Packard 660C ink jet printer using a black ink standard for such a printer. The black ink consisted of an aqueous dispersion of carbon black together with 2-pyrrolidinone, N-methyl-2-pyrrolidone and polyethylene glycol.

The optical density (OD) was measured using a Macbeth Densitometer and the results are shown in the final row of Table 1.

TABLE 1

| | 1 | 2 | 3 | 4 | 5 | 6 |
|---|---|---|---|---|---|---|
| A1(g) | — | — | — | — | 10.5 | — |
| B1(g) | 3.75 | 3.5 | 12 | 12 | — | 11.4 |
| C1(g) | 1.25 | 1.5 | — | — | 1.5 | — |
| D1(g) | — | — | — | — | — | 0.64 |
| E1(g) | — | — | 3 | 3 | 3 | 3 |
| F1(g) | — | — | — | — | 0.9 | — |
| G1(g) | — | 0.1 | 0.3 | 0.3 | 0.3 | 0.45 |
| H1(g) | — | — | — | 0.75 | 0.45 | 0.23 |
| I1(g) | 0.2 | 0.2 | 0.33 | 0.33 | 0.5 | 0.5 |
| J1(g) | 31.5 | 31.5 | 94.5 | 94.5 | 108 | 108 |
| K1(g) | 13.5 | 13.5 | 30.5 | 30.5 | 97 | 27 |
| OD | 1.97 | 2.15 | 1.99 | 2.07 | 1.9 | 2.09 |

In Table 1:

A1 is Methocel F50 (Methocel is a Trade Mark), a hydroxypropyl methyl cellulose (from The Dow Chemical Co), B1 is Methocel E50, a hydroxypropyl methyl cellulose (from The Dow Chemical Co), C1 is Surcol 441 (Surcol is a Trade Mark), a carboxylated acrylic copolymer (from Allied Colloids), D1 is Natrosol 250L (Natrosol is a Trade Mark), a hydroxyethyl cellulose (from Aqualon Colloids), E1 is Surcol 860, a carboxylated acrylic copolymer (from Allied Colloids), F1 is PEG 1500, a polyethylene glycol having a molecular weight of 1500 (from Fisher Scientific), G1 is tri-ammonium citrate SLR (from Fisher Scientific), H1 is lithium nitrate (from Fisher Scientific), H1 is an ammonia solution (about 0.91 specific gravity, from Fisher Scientific), J1 is methanol, and K1 is deionised water.

Surcol 860 has half the acid value of Surcol 441. Both Surcol 860 and Surcol 441 are insoluble in water at pH <7, at room temperature, but are soluble in alkali.

(1) is a formulation simply comprising HPMC and Surcol 441.

(2) is a formulation demonstrating the effect of tri-ammonium citrate addition.

(3) is a formulation demonstrating an alternative grade of Surcol (860).

(4) is a formulation demonstrating the effect of lithium nitrate addition.

(5) is a formulation demonstrating an alternative grade of Methocel, F50, and also the addition of polyethylene glycol.

(6) is a formulation demonstrating the addition of Natrosol 250L.

EXAMPLE 2

Further substrate samples were coated with ink absorbent layers based on the formulations 7 to 10 shown in Table 2 using the method of Example 1 and printed in the same way as in Example 1. The optical density results are shown in the final row of Table 2.

TABLE 2

| | 7 | 8 | 9 | 10 |
|---|---|---|---|---|
| A2(g) | 12.0 | 11.4 | 11.7 | 11.7 |
| B2(g) | — | 0.60 | 0.30 | 0.30 |
| C2(g) | 10.0 | 10.0 | 10.0 | 10.0 |
| D2(g) | 0.45 | 0.30 | 0.30 | 0.30 |
| E2(g) | 108 | 108 | 108 | 121 |
| F2(g) | 23 | 23 | 23 | 23 |
| OD | 1.90 | 1.90 | 2.09 | 2.10 |

In Table 2

A2 is Methocel E50, a hydroxypropyl methyl cellulose (from The Dow Chemical Co), B2 is Natrosol 250L, a hydroxyethyl cellulose (from Aqualon), C2 is Cromelastic HH-29PG (Cromelastic is a Trade Mark), a 26% solids, aqueous dispersion of a carboxylated polyurethane resin (from Cromogenia Units S.A.), D2 is tri-ammonium citrate SLR (from Fisher Scientific)

E2 is methanol, and

F2 is water.

Cromelastic HH-29PG (which is also known as Helastic HH-29PG (Helastic is a Trade Mark)) is an aqueous aliphatic polyurethane dispersion with a solids content of approximately 26%. The resin is insoluble in water at pH<7 at room temperature.

EXAMPLE 3

Example 2 was repeated using the formulations shown in Table 3.

TABLE 3

| | 11 | 12 | 13 | 14 |
|---|---|---|---|---|
| A3(g) | 11.7 | 11.7 | 11.7 | 11.7 |
| B3(g) | 0.30 | 0.30 | 0.30 | 0.30 |
| C3(g) | 10.0 | 10.0 | 10.0 | 10.0 |
| D3(g) | 0.45 | 0.45 | 0.45 | 0.45 |
| E3(g) | 114 | 114 | 114 | 114 |
| F3(g) | 29 | 29 | 29 | 29 |
| OD | 1.70 | 1.75 | 1.90 | 2.00 |

In Table 3:

A3 is Methocel E50, a hydroxypropyl methyl cellulose (from The Dow Chemical Co), B3 is Natrosol 250L, a hydroxyethyl cellulose (from Aqualon), C3 is Cromelastic HH-29PG, a 76% solids, aqueous dispersion of a carboxylated polyurethane resin (from Cromogenia Units S.A.), D3 (Sample 11) is tartaric acid (from Aldrich), D3 (Sample 12) is succinic acid (from Aldrich), D3 (Sample 13) is acetic acid glacial (from Aldrich), D3 (Sample 14) is malic acid (from Aldrich), E3 is methanol, and F3 is water.

EXAMPLE 4

A further inkable sheet was prepared in the same way as in Example 1 except that the ink absorbent layer comprised:

| | |
|---|---|
| Methosol E5, a hydroxypropyl methyl cellulose (from Dow Chemical Co) | 4.0 g |
| Blanose 7LC, a sodium salt of carboxymethycellulose (from Aqualon) | 3.0 g |
| Goodrite K752, a 65% solids aqueous solution of a polyacrylate/polyacrylic acid (from B F Goodrich) | 1.5 g |
| Cymel 350, a melamine formaldehyde resin crosslinker (from Dyno Cyanamid) | 0.1 g |
| PK3, an amine salt of p-toluene sulphonic acid, described below | 0.5 g |
| PEG 1500, a polyethylene glycol of molecular weight 1500 (from Fisher Scientific) | 2.0 g |
| Deionised water | 64.8 g |

PK3 was prepared by mixing methanol (26.0 g) with p-toluene sulphonic acid (11.36 g), and very slowly adding thereto, with stirring, di-n-butylamine (7.72 g).

After printing in the same way as in Example 1, the optical density was measured as being 2.3.

In this example, the acid functional resin (Goodrite K752) is soluble in cold water but is nevertheless effective due to the action of the cross linking agent.

EXAMPLE 5

A further inkable sheet was prepared in the same way as in Example 1 except that the ink absorbent layer comprised:

| | |
|---|---|
| Methocel E5, a hydroxypropyl methyl cellulose (from Dow Chemical Co) | 11.4 g |
| Natrosol 250 L. a hydroxyethyl cellulose (from Aqualon) | 0.6 g |
| Joncryl 74 (Joncryl is a Trade Mark), a 47% solids, aqueous dispersion of an acid functional acrylic copolymer (from S. C. Johnson Polymer b.v.) | 6.4 g |
| Tri-ammonium citrate (from Fisher Scientific) | 0.45 g |
| Slip-Ayd SL 530 (Slip-Ayd is a Trade Mark), a 18% solids, polyethylene was dispersion in 2-butoxyethanol (from Daniel Products) | 0.3 g |
| Methanol | 108 g |
| Deionised water | 23 g |

Joncryl 74 is insoluble in water of neutral or acidic pH at room temperature,

After printing in the same way as in Example 1, the optical density was measured as being 2.15.

EXAMPLE 6

This is a comparative example not in accordance with the present invention.

An inkable sheet was prepared and printed in the same way as in Example 1 except that the ink absorbent layer had the formulation:

| | |
|---|---|
| Natrosol 330 Plus, a hydroxy ethyl cellulose (from Aqualon) | 4.5 g |
| Natrosol 250 L, a hydroxy ethyl cellulose (from Aqualon) | 3.0 g |
| Polymin P, a polyethylene imine crosslinker (from BASF) | 0.27 g |
| Ammonia (about 0.91 specific gravity, from Fisher Scientific) | 0.05 ml |
| Methanol | 117 ml |
| Deionised water | 29 ml |

The printed image had a crazed appearance and the optical density was 1.0.

Surcol 860 (used in Example 1) has a Tg of 55° C. and produced sheets with a curl of 55 mm (which is commercially acceptable but not particularly good). Joncryl 74 (used in Example 5) has a Tg of −8° C. and produced sheets with a curl of 21 mm (which is good). Curl was measured by incubating sheets at 30° C. relative humidity 80% for 1 hour, then placing the sheets on a running overhead projector and measuring average corner lift after 5 minutes.

What is claimed is:

1. An inkable sheet comprising a substrate having on at least one surface thereof an ink absorbent layer comprising a cellulose material and an acid functional resin, wherein the acid functional resin is insoluble in water of neutral or acidic pH at room temperature.

2. An inkable sheet according to claim 1, wherein the ink absorbent layer further comprises a weak organic acid or salt thereof.

3. An inkable sheet according to claim 2, wherein the weak organic acid or salt thereof comprises citric acid, tartaric acid, succinic acid, acetic acid or malic acid or an ammonium salt thereof.

4. An inkable sheet according to claim 3, wherein the weak organic acid or salt thereof comprises citric acid or an ammonium salt thereof.

5. An ink sheet according to claim 2, 3 or 4 wherein the ink absorbent layer further comprises at least one crosslinking agent.

6. An inkable sheet according to claim 2, 3 or 4 wherein the ink absorbent layer further comprises at least one crosslinking agent selected from the group consisting of a melamine formaldehyde resin, polyethylene imine, urea formaldehyde or a blocked isocyanate.

7. An inkable sheet according to claim 1, wherein the ink absorbent layer further comprises at least one cross linking agent.

8. An inkable sheet according to claim 7, wherein the cross linking agent comprises a melamine formaldehyde resin, polyethylene imine, urea formaldehyde or a blocked isocyanate.

9. An inkable sheet according to claim 1, wherein the cellulose material comprises hydroxypropylmethyl cellulose.

10. An inkable sheet according to claim 1, wherein the acid functional resin comprises an acid functional polyurethane resin or an acid functional acrylic resin.

11. An inkable sheet according to claim 1, wherein the acid functional resin has a Tg below room temperature.

12. An inkable sheet according to claim 1, wherein the ink absorbent layer further comprises an agent which reduces crystallisation of coloured dyes applied to the inkable sheet.

13. An inkable sheet according to claim 12, wherein the agent comprises hydroxyethyl cellulose.

14. An inkable sheet according to claim 1, wherein the ink absorbent layer further comprises an anti-curl agent.

15. An inkable sheet according to claim 14, wherein the anti-curl agent comprises a polymer having hydroxyl groups or oxygen-ether links.

16. An inkable sheet according to claim 15, wherein the polymer comprises polyethylene glycol.

17. An inkable sheet according to claim 1, wherein the ink absorbent layer further comprises an absorptive agent for increasing the rate of water absorption from ink applied to the absorbent layer.

18. An inkable sheet according to claim 17, wherein the absorptive agent comprises lithium nitrate.

19. An inkable sheet according to claim 1, wherein the substrate comprises a polyester terephthalate film.

20. An inkable sheet according to claim 1, wherein the substrate has a thickness in the range of 75 to 130 $\mu$m.

21. A process of preparing an inkable sheet according to claim 1, which process comprises applying said ink absorbent layer to at least one surface of a substrate.

22. In a method of ink jet printing wherein ink droplets are projected onto an inkable sheet, the improvement wherein the inkable sheet comprises a substrate having on at least one surface thereof an ink absorbent layer comprising a cellulose material and an acid functional resin, wherein the acid functional resin is insoluble in water of neutral or acidic pH at room temperature.

* * * * *